United States Patent
Tappan

(10) Patent No.: US 7,529,257 B1
(45) Date of Patent: May 5, 2009

(54) METHOD FOR SUPPORTING A GMPLS HIERARCHY THROUGH MULTIPLE ROUTING INSTANCES

(75) Inventor: Daniel Tappan, Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 863 days.

(21) Appl. No.: 10/426,739

(22) Filed: Apr. 30, 2003

(51) Int. Cl.
*H04L 12/28* (2006.01)
*H04J 3/22* (2006.01)
*G06F 15/173* (2006.01)

(52) U.S. Cl. .................. 370/409; 370/466; 709/238

(58) Field of Classification Search .......... 370/351, 370/397, 399, 400, 401, 409, 464–467; 709/230, 709/238
See application file for complete search history.

(56) References Cited

U.S. PATENT DOCUMENTS

| | | | |
|---|---|---|---|
| 6,205,488 B1* | 3/2001 | Casey et al. | 709/238 |
| 6,337,861 B1 | 1/2002 | Rosen | 370/389 |
| 6,339,595 B1 | 1/2002 | Rekhter et al. | 370/392 |
| 7,039,720 B2* | 5/2006 | Alfieri et al. | 709/242 |
| 7,076,559 B1* | 7/2006 | Ghanwani et al. | 709/230 |
| 7,283,529 B2* | 10/2007 | Basso et al. | 370/409 |
| 7,301,911 B2* | 11/2007 | Mack-Crane et al. | 370/400 |
| 2003/0067880 A1* | 4/2003 | Chiruvolu | 370/237 |
| 2004/0028064 A1* | 2/2004 | Cetin et al. | 370/409 |
| 2004/0184441 A1* | 9/2004 | Wu et al. | 370/351 |
| 2006/0036719 A1* | 2/2006 | Bodin et al. | 709/223 |
| 2006/0209785 A1* | 9/2006 | Iovanna et al. | 370/351 |

OTHER PUBLICATIONS

E. Rosen, "BGP/MPLS VPNs", IETF RFC 2547, Mar. 1999.
Ayan Banerjee et al., "Generalized Multiprotocol Label Switching: An Overview of Routing and Management Enhancements", IEEE Communications Magazine, pp. 144-150, Jan. 2001.
Kireeti Kompella et al., "LSP Hierarchy With Generalized MPLS TE", Internet Draft, Mar. 2002.

* cited by examiner

*Primary Examiner*—Aung S Moe
*Assistant Examiner*—Kerri M Rose
(74) *Attorney, Agent, or Firm*—Cindy Kaplan

(57) ABSTRACT

A method for supporting a GMPLS hierarchy through multiple routing instances in a network having multiple regions is disclosed. Each region has associated therewith a separate routing instance. The method includes initiating creating a link between two regions at an edge device of a first region and selecting a path between the two regions. A message is forwarded from the edge device to a network device coupled to a second region and a response is received from the network device at the edge device. A new LSP linking the two regions is inserted into a routing database for a routing instance associated with the second region.

20 Claims, 6 Drawing Sheets

METHOD FOR SUPPORTING A GMPLS HIERARCHY THROUGH MULTIPLE ROUTING INSTANCES

BACKGROUND OF THE INVENTION

The present invention relates generally to communication networks, and more specifically, to a method and system for supporting a GMPLS (Generalized MultiProtocol Label Switching) hierarchy through multiple routing instances.

The rapid growth of the Internet and the widespread deployment of networks built around the Internet Protocol suite are creating a demand for new capabilities in IP (Internet Protocol) networks. MultiProtocol Label Switching (MPLS) provides a number of powerful capabilities such as traffic engineering, etc. As with IP routers, MPLS nodes use a routing protocol such as OSPF or IS-IS to calculate network paths and establish reachability. MPLS is an IETF (Internet Engineering Task Force) initiative that integrates Layer 2 information about network links (bandwidth, latency, utilization) into Layer 3 (IP) within a particular autonomous system in order to simplify and improve IP packet exchange. MPLS provides network operators a great deal of flexibility to divert and route traffic around link failures, congestion, and bottlenecks.

MPLS enabled networks are becoming increasingly important for today's service providers (SPs) in the design and deployment of current and future networks. A primary contributing factor is that MPLS, as an enabling technology, has the capability of converging not only voice, data, and video, but also frame, cell, and packet networks into a single network. Deploying and managing a single and scaleable network is a great benefit to service providers. Furthermore, MPLS networks also allow service providers to do traffic engineering, and quickly reroute customer traffic upon identification of a link failure within their network. This is an important feature for carrier class networks.

Generalized MPLS (GMPLS) extends MPLS to provide a control plane (signaling and routing) for devices that switch in domains such as packet, time, wavelength, and fiber. This common control plane simplifies network operation and management by automating end-to-end provisioning of connections, managing network resources, and providing a level of QoS that is expected in new applications. GMPLS extends the suite of IP-based protocols that manage and control the establishment and release of label switched paths (LSPs) that traverse any combination of packet, TDM, and optical networks.

The IETF work on GMPLS defines support for using the MPLS Traffic Engineering routing and signaling mechanisms to set up connections across networks which use a variety of switching mechanisms. The IETF also describes a hierarchy of different network types and the concept of a device which sits at the boundary of a hierarchy region (see, Internet Draft "LSP Hierarchy with Generalized MPLS TE", draft-ietf-mpls-lsp-hierarchy-08.txt, Kompella et al., March 2002). For example, a router connected to an optical switch would provide the boundary between the frame and optical regions of a network.

However, the Internet Draft does not define how to integrate two such regions. The Internet Draft implies that both regions of the network would participate in a single instance of routing and signaling. From a practical point of view, it may not be possible to deploy such a network. For example, an Internet Service Provider (ISP) operator may want to deploy GMPLS into a network made up of routers which may or may not be running MPLS. The existing network may have a defined organization of its routing domain (Interior Routing Protocol or IGP (Interior Gateway Protocol) domain). In particular, the ISP may have divided the network into areas as defined by the OSPF protocol specification, or "levels" as defined by IS-IS. Current implementations of MPLS traffic engineering support a single area or level. Routers which need to see the full topology of the network in order to calculate the optimum path for an LSP must be in the same area. IGPs typically require that such areas or levels be contiguous, and define a single backbone area (e.g., "area 0" for OSPF).

The ISP operator may not want to merge the IGP of an experimental optical region with that of the existing frame network. The two networks may be running two different IGPs. The existing frame network may use, for example, ISIS, but the optical switch devices may only support OSPF. The ISP may not want to risk destabilizing the existing IGP by introducing a new implementation into the network. Furthermore, deploying the optical region as, for example, OSPF area 0, would require reconfiguring the existing IGP, which is not very practical.

The ISP operator may also be concerned about leaking addressing information from the optical region into the frame region. Since optical switches cannot, in general, provide connectionless packet forwarding, such leakage may cause forwarding problems in cases where LSPs have not been established between two edge routers.

There is, therefore, a need for a method and system which allow deployment of GMPLS into an existing network without disrupting the existing IGP.

SUMMARY OF THE INVENTION

A method for supporting a GMPLS hierarchy through multiple routing instances in a network having multiple regions is disclosed. Each region has associated therewith a separate routing instance. The method includes creating a link between two regions at an edge device of a first region and selecting a path between the two regions. A message is forwarded from the edge device to a network device coupled to a second region and a response is received from the network device at the edge device. A new LSP linking the two regions is inserted into a routing database for a routing instance associated with the second region.

In one embodiment, the link may be initiated at an edge device located at the edge of two regions, A and B, and the network device is a terminating device located at the edge of two regions, B and C.

In another aspect of the invention, a system for supporting a GMPLS hierarchy through multiple routing instances generally comprises a processor located at an edge device of a first region and operable to create a link between first and second regions. The processor is configured to select a path, forward a message along the path from the edge device to a network device coupled to the second region, receive a response from the network device, and insert a new LSP linking the first and second regions into a routing database for a routing instance associated with the second region. The system further includes memory configured to at least temporarily store the routing instances associated with the first and second regions.

The above is a brief description of advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

Figure 1:
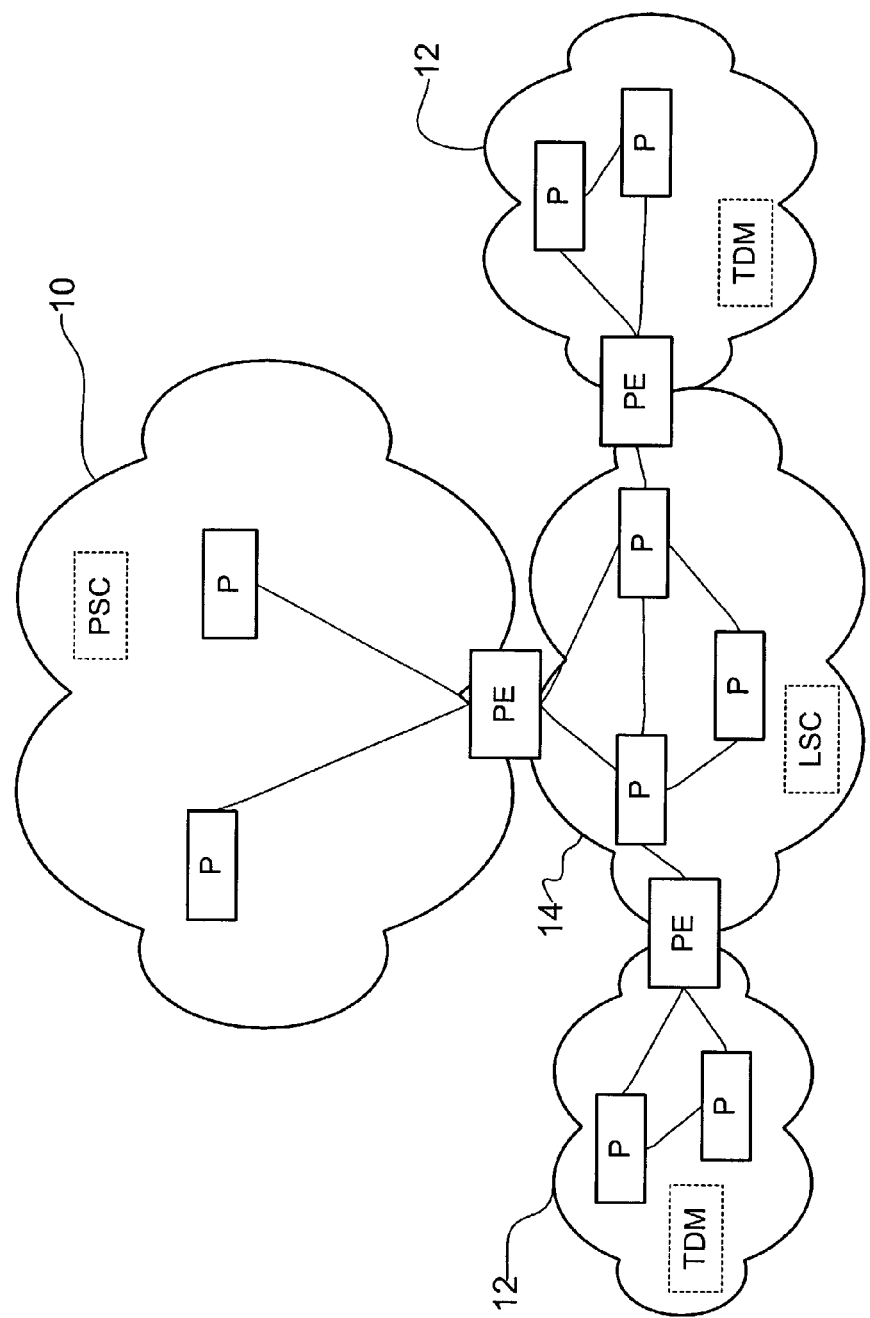
FIG. 1 is a diagram illustrating regions of a multi-level topology network.

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. A network element may be, for example, a terminal multiplexer, an add-drop multiplexer (ADM), an optical crossconnect (OXC), a signal regenerator, router, switch, or other optical node interface. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, a hardware assisted forwarding engine, and a bus (e.g., a PCI bus). The CPU preferably includes a memory and a processor. When acting under the control of appropriate software or firmware, the CPU is responsible for such router tasks as routing table computations, network management, and processing of protocol packets. It preferably accomplishes all these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling operations of the router. Memory can be non-volatile RAM and/or ROM. However, there are many different ways in which memory could be coupled to the system. In an alternative embodiment, a router or switch may be implemented on a general purpose network host machine such as a computer system described below.

Network Working Group Request for Comments (RFC) 2547 ("BGP/MPLS VPNs", E. Rosen et al., March 1999), which is incorporated herein by reference in its entirety, describes a method by which a service provider with an IP backbone may provide VPNs (Virtual Private Networks) for its customers. MPLS is used for forwarding packets over the backbone, and BGP is used for distributing routes over the backbone.

The present invention uses the concept of multiple routing instances as described in RFC 2547 (see also, U.S. Pat. Nos. 6,339,595 (Rekhter et al.) and 6,337,861 (Rosen), which are incorporated herein by reference in their entirety). A routing instance is a collection of routing tables, interfaces, and routing protocol parameters. A VPN Routing/Forwarding (VRF) instance advertises routes from a customer edge (CE) router to a provider edge (PE) router and advertises routes from the PE router to the CE router. Each VPN receives only routing information belonging to that VPN. The present invention extends the concept of VRF instances by applying it to the routing and signaling information used for MPLS traffic engineering. As described in detail below, multiple routing instances are created and provide support for multiple signaling instances.

FIG. 1 illustrates an example of a GMPLS network with multi-level topologies. Data transmission occurs on label-switched paths (LSPs). LSPs are a sequence of labels at each and every node along the path from the source to the destination. The routers may be, for example, an edge router or a label switching router (LSR). The LSRs participate in the establishment of LSPs using the appropriate label signaling protocol and high-speed switching of the data traffic based on the established paths. Edge routers operate at the edge of the networks and support multiple ports connected to dissimilar networks. The edge routers forward traffic on to the network after establishing LSPs, using a label signaling protocol at the ingress and distributing the traffic back to the networks at the egress. A label identifies the path a packet should traverse. The receiving device uses the label information associated with a packet to determine the next hop. Once a packet has been labeled, the travel of the packet through the network backbone is based on label switching.

LSPs of different interfaces may be nested inside other LSPs; in general, an LSP of a given level can carry LSPs of any lower level. Typically, the highest LSP hierarchy is used for nodes that have Fiber Switch Capable (FSC) interfaces, followed by nodes that have Lambda Switch Capable (LSC) interfaces, followed by nodes that have TDM (Time Division Multiplexing) capable interfaces, and followed by nodes with Packet Switch Capable (PSC) interfaces. The network shown in FIG. 1 includes four regions with network devices coupled together with intra-region and inter-region links. The network includes one PSC region 10, two TDM regions 12, and one LSC region 14. Each region includes provider (or customer) routers (P) and edge routers (PE). It is to be understood that the network shown is only one example and that networks having configurations or elements other than shown herein may be used without departing from the scope of the invention.

Figure 2:
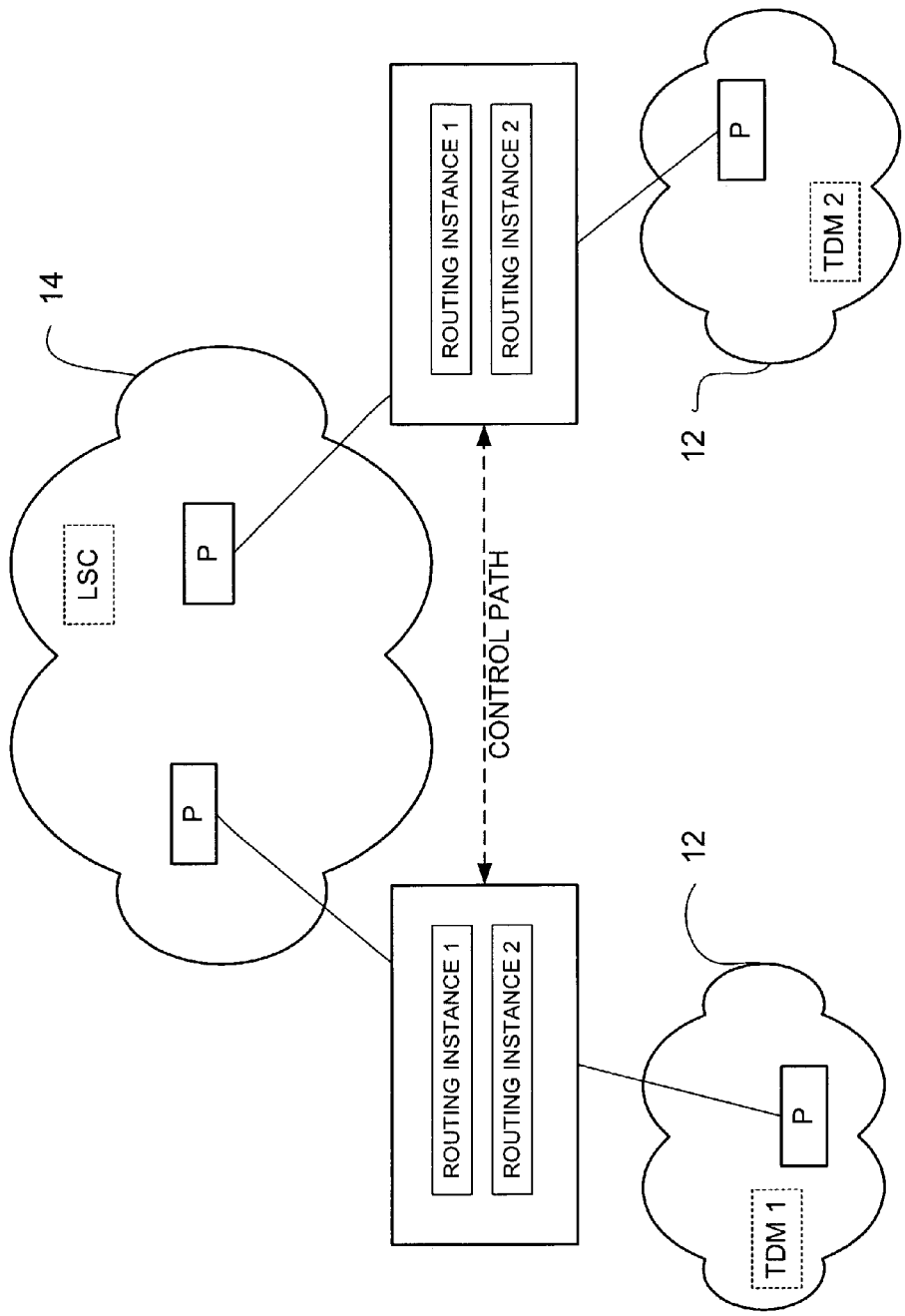
FIG. 2 is a diagram illustrating additional details of devices located at an edge of a network region of FIG. 1.

FIG. 2 illustrates details of devices located at the edge of a region shown in FIG. 1. Each device runs multiple routing instances. For example, the devices shown in FIG. 2 each include two routing instances. The routing instances may be, for example, the VRF instances described in RFC 2547 (referenced above). However, it is not necessary to associate each instance with a particular set of interfaces, as described in RFC 2547. Each device runs GMPLS routing and signaling for a region. An edge device may participate in multiple levels of hierarchy and support multiple, independent, instances of a hierarchy level. A control plane located between segments of regions may be in-band, through FAs, or out-of band.

Figure 3:
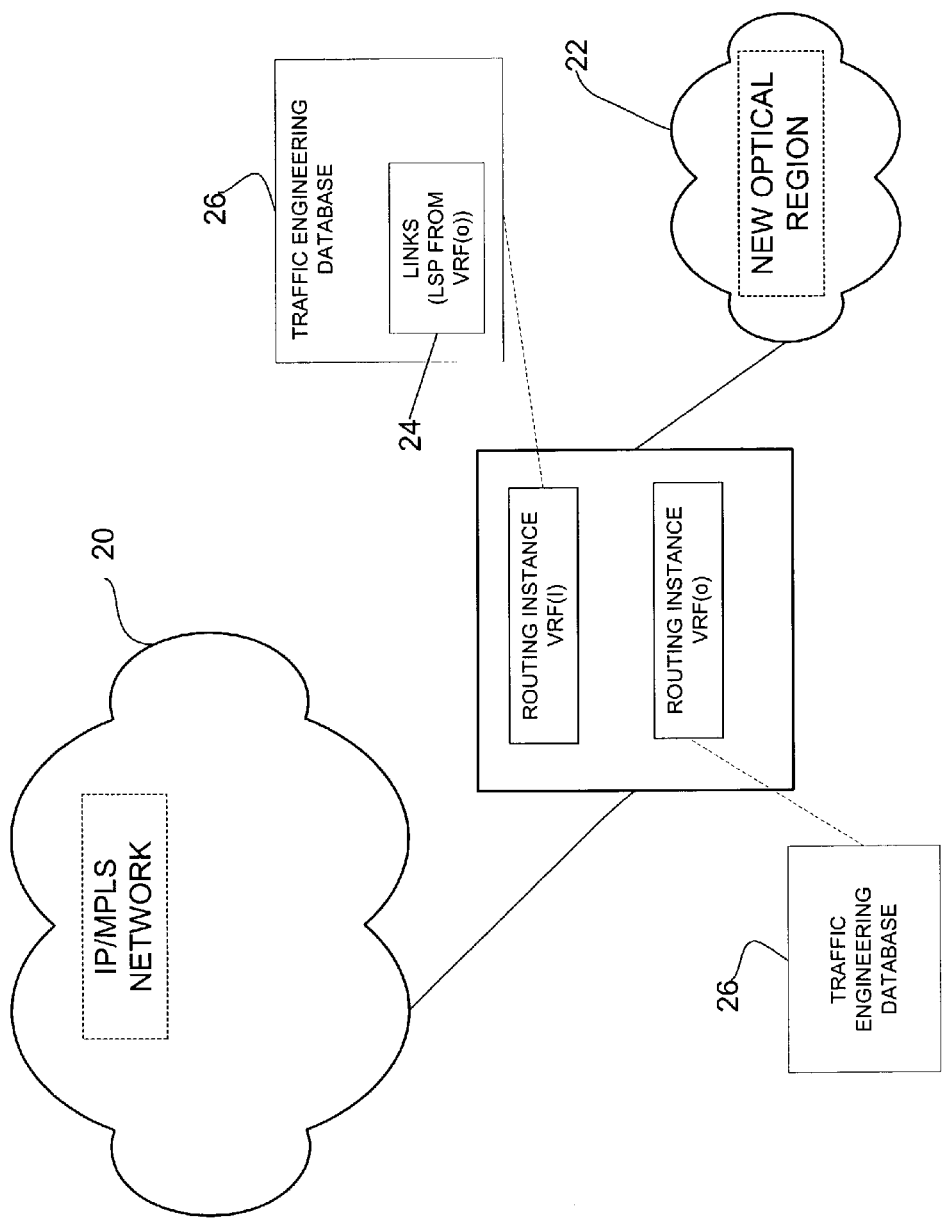
FIG. 3 is a diagram illustrating routing instances for an existing IP/MPLS network and a new optical region.

Each region of the network is placed into a separate instance. For example, an existing frame based IP/MPLS network 20 stays in its existing routing instance (VRF(I)) (FIG. 3). A new instance, referred to as VRF(o) is applied to the router interfaces which are connected to an experimental optical region 22. The routing and signaling information in VRF(o) is used to establish LSPs across the optical region. These LSPs can then be injected into VRF(I) either as Forwarding Adjacencies (as described in draft-ietf-mpls-lsp-hierarchy referenced above) or as normal routing adjacencies. In either case, these appear to VRF(I) as simple links 24. Each routing instance has its own traffic engineering database 26. Each signaling instance has its own circuit database and information for routing signaling requests.

Figure 4:
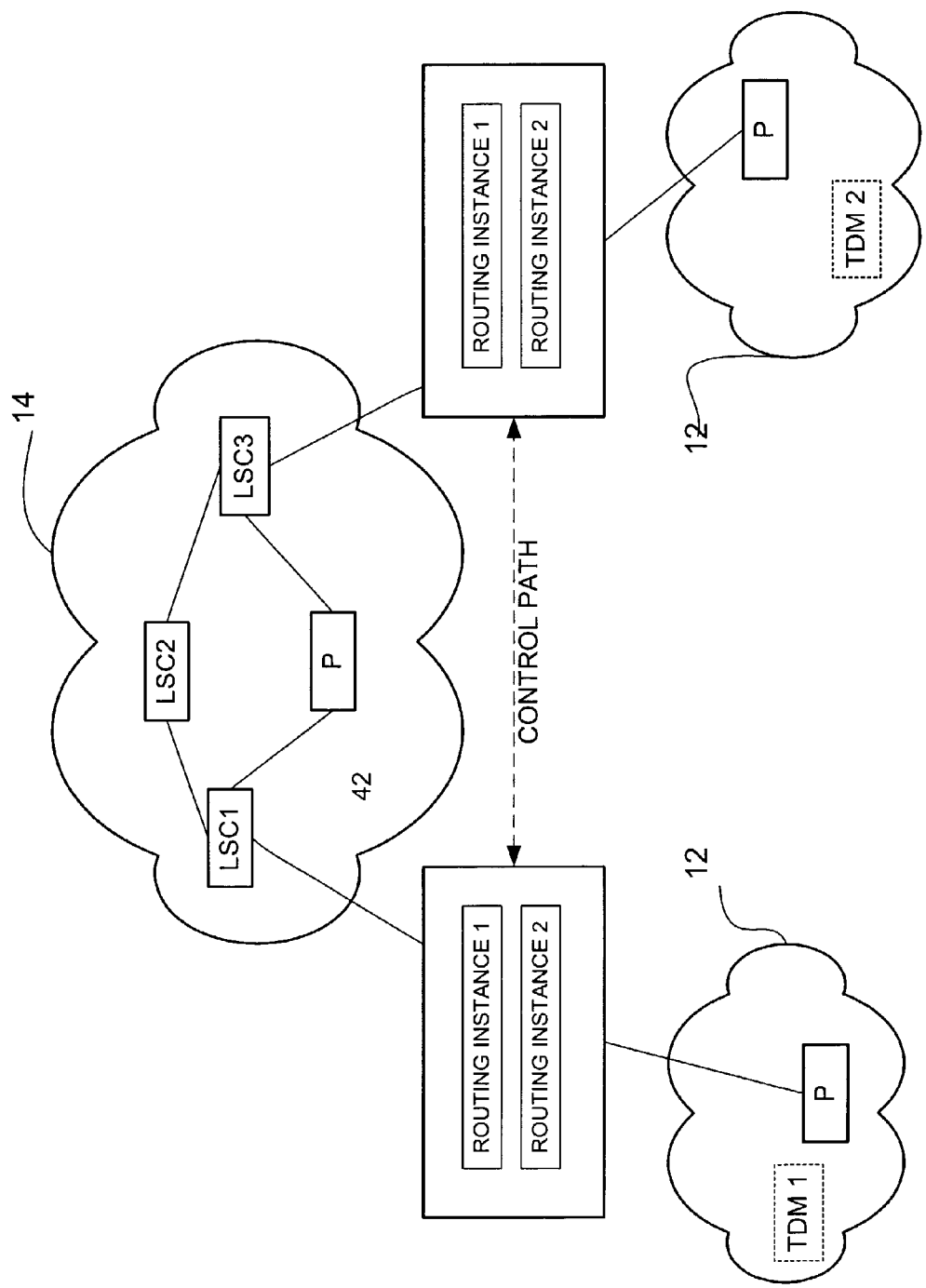
FIG. 4 is a diagram illustrating a path for creation of a data forwarding adjacency between devices shown in FIG. 2.

FIG. 4 is a diagram illustrating a path for creation of a data FA from TDM1 to TDM2. Once a path is set up it is made available as a link. The data links may be created through operator configuration based on traffic measurements or modeling. The links may also be created through use of an automatic algorithm providing complete, partial mesh, connectivity between segments of a level. The data links may be created as needed based on traffic patterns.

Figure 5:
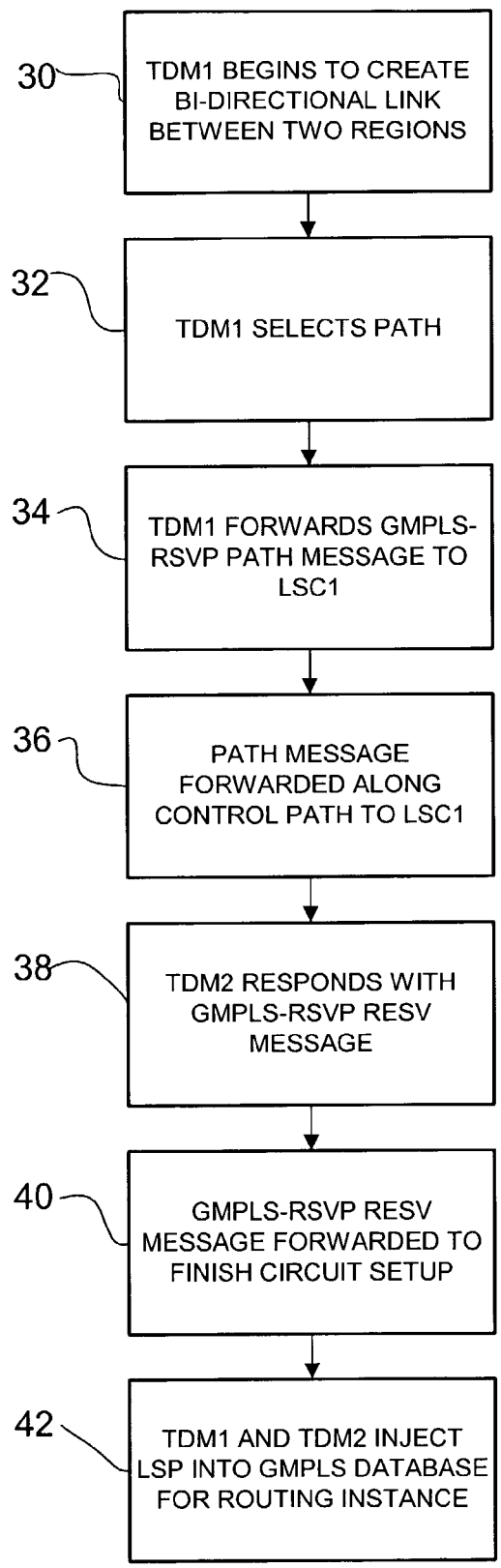
FIG. 5 is a flowchart illustrating a process for creating links between the network regions with multiple routing instances.

FIG. 5 is a flowchart illustrating a process for creating a data FA from TDM1 to TDM2 (as shown in FIG. 4). At step 30 TDM1 decides (through configuration or otherwise) to create a bi-directional LSP to link the two regions 12. TDM1 consults a GMPLS routing database in routing instance 1 and selects a path (e.g., TDM1, LSC1, LSC2, TDM2, as shown in FIG. 4) (step 32). TDM1 then forwards a GMPLS-RSVP PATH message to LSC1 (step 34). The PATH message is forwarded hop-by-hop along the control path to TDM2 (step 36). TDM2 responds with a GMPLS-RSVP RESV message at step 38. This message is forwarded back along the path to finish the circuit setup (step 40). TDM1 and TDM2 then inject the LSP into the GMPLS (or IP) routing database for routing instance 2 (step 42).

The above described process may be extended to other parts of the LSP hierarchy, beyond the router/optical boundary described above. For example, it may be applied to a set of SONET/TDM devices connected to a network of Photonic Crossconnects (PXC).

Security is provided, for example between a PSC region and an LSC region, since an LSC-edge device accepts only routing information originating at a PSC-edge device. The LSC-edge device forwards the PSC-edge device only routing information for the LSC-region and other edge devices in the PSC-region. The PSC-edge device applies policy constraints to select which paths are requested across the LSC-region. The LSC-edge device applies policy enforcement to validate requests from the PSC-edge. The system also prevents information from being leaked between instances. For example, if two PSC regions are separated by an LSC region, the system allows the operator to prevent leakage of information between the different PSC regions.

Figure 6:
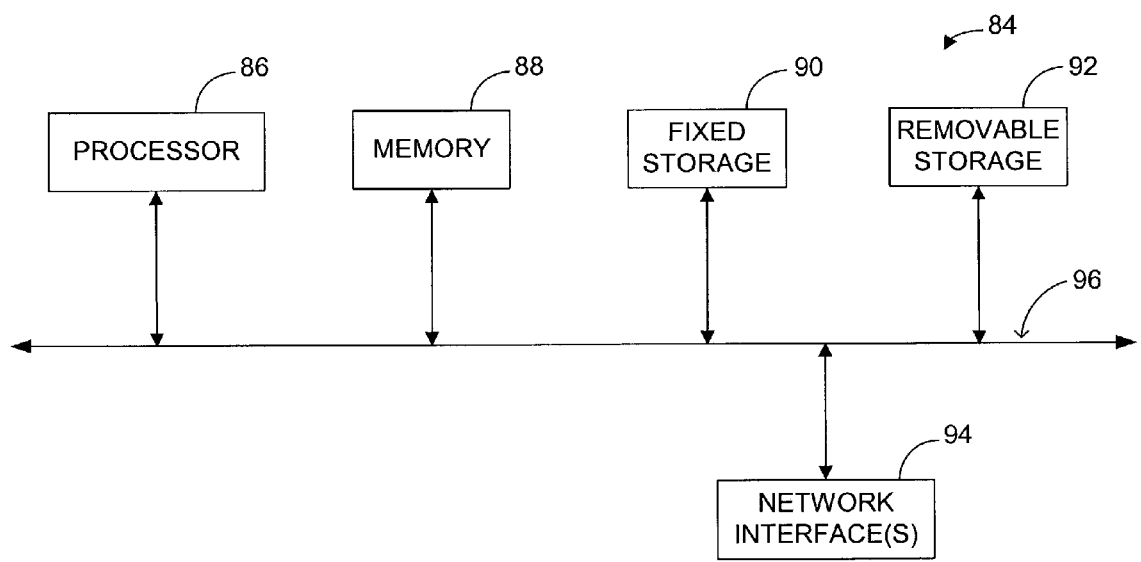
FIG. 6 is a system block diagram of a computer system that can be utilized to execute software of an embodiment of the present invention.

The invention described herein may be implemented in dedicated hardware, microcode, software, or photonic (optical) logic. FIG. 6 shows a system block diagram of computer system 84 that may be used as a router or host or used to execute software of an embodiment of the invention. The computer system 84 includes memory 88 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 84 further includes subsystems such as a central processor 86, fixed storage 90 (e.g., hard drive), removable storage 92 (e.g., CD-ROM drive), and one or more network interfaces 94. Other computer systems suitable for use with the invention may include additional or fewer subsystems. For example, computer system 84 may include more than one processor 86 (i.e., a multi-processor system) or a cache memory.

The system bus architecture of computer system 84 is represented by arrows 96 in FIG. 6. However, these arrows are only illustrative of one possible interconnection scheme serving to link the subsystems. For example, a local bus may be utilized to connect the central processor 86 to the system memory 88. Computer system 84 shown in FIG. 6 is only one example of a computer system suitable for use with the invention. Other computer architectures having different configurations of subsystems may also be utilized. Communication between computers within the network is made possible with the use of communication protocols, which govern how computers exchange information over a network.

As can be observed from the foregoing, the present invention provides numerous advantages. For example, the system allows for deployment of GMPLS into an existing network without disturbing the existing IGP.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for supporting a Generalized MultiProtocol Label Switching (GMPLS) hierarchy through multiple routing instances in a network having multiple regions, each region having associated therewith a separate routing instance, the method comprising:

creating a link between two regions of a virtual private network at an edge device of a first region having a first routing instance associated therewith, wherein each of said two regions comprises a different Label-Switched Path (LSP) hierarchy and said edge device is configured to participate in multiple levels of said hierarchy;

selecting a path;

forwarding a message along said path from the edge device to a network device coupled to a second region;

receiving a response from the network device at the edge device;

inserting a new Label-Switched Path (LSP) linking the two regions into a routing database for a second routing instance associated with the second region and different from said first routing instance;

injecting said new LSP into said first routing instance as a forwarding or routing adjacency, wherein said new LSP appears as a link to said first routing instance; and transmitting data on the network using said new LSP.

2. The method of claim 1 wherein selecting a path comprises consulting a routing database located in a routing instance associated with the first region.

3. The method of claim 1 wherein each of the routing instances has a traffic engineering database associated therewith.

4. The method of claim 3 wherein said first and second routing instances support first and second signaling instances and wherein each of said signaling instances has a circuit database associated therewith.

5. The method of claim 1 wherein the first region is Time Division Multiplexing (TDM) capable.

6. The method of claim 1 wherein the first region is packet switch capable.

7. The method of claim 1 wherein the first region is lambda switch capable.

8. The method of claim 1 wherein the first region is fibre switch capable.

9. The method of claim 1 wherein the routing instances are Virtual Private Network Routing/Forwarding (VRF) instances.

10. The method of claim 1 wherein inserting the new LSP comprises inserting the LSP as a forwarding adjacency.

11. The method of claim 1 wherein inserting the new LSP comprises inserting the LSP as a routing adjacency.

12. The method of claim 1 wherein a routing instance associated with the first region and the routing instance associated with the second region are located within the edge device of the first region.

13. A system for supporting a Generalized MultiProtocol Label Switching (GMPLS) hierarchy through multiple routing instances in a network having multiple regions, each region having associated therewith a separate routing instance, the system comprising:

a processor located at an edge device of a first region and operable to create a link between said first region and a second region of a virtual private network and configured to select a path, forward a message along said path from the edge device to a network device coupled to said second region, receive a response from the network device, insert a new Label-Switched Path (LSP) linking said first and second regions into a routing database for a second routing instance associated with said second region and different from a first routing instance associated with said first region, and inject said new LSP into said first routing instance as a forwarding or routing adjacency, wherein said new LSP appears as a link to said first routing instance; and memory configured to at least temporarily store the routing instances associated with said first and second regions;

wherein each of said first and second regions comprises a different Label-Switched Path (LSP) hierarchy and said processor is configured to participate in multiple levels of said hierarchy.

14. The system of claim 13 wherein each of the routing instances has a traffic engineering database associated therewith.

15. The system of claim 13 wherein the routing instances are Virtual Private Network Routing/Forwarding (VRF) instances.

16. The system of claim 13 wherein said first routing instance associated with the first region and said second routing instance associated with the second region are located within the edge device of the first region.

17. A computer program product for supporting a Generalized MultiProtocol Label Switching (GMPLS) hierarchy through multiple routing instances in a network having multiple regions, each region having associated therewith a separate routing instance, the product comprising:

code that initiates creating a link between two regions of a virtual private network at an edge device of a first region having a first routing instance associated therewith, wherein each of said two regions comprises a different Label-Switched Path (LSP) hierarchy and said edge device is configured to participate in multiple levels of said hierarchy;

code that selects a path;

code that forwards a message along said path from the edge device to a network device coupled to a second region;

code that receives a response from the network device at the edge device;

code that inserts a new Label-Switched Path (LSP) linking the two regions into a routing database for a second routing instance associated with the second region and different from said first routing instance;

code that injects said new LSP into said first routing instance as a forwarding or routing adjacency, wherein said new LSP appears as a link to said first routing instance; and a computer-readable storage medium for storing the codes.

18. The computer program product of claim 17 wherein said first routing instance associated with the first region and said second routing instance associated with the second region are located within the edge device of the first region.

19. An apparatus for supporting a Generalized MultiProtocol Label Switching (GMPLS) hierarchy through multiple routing instances in a network having multiple regions, each region having associated therewith a separate routing instance, the apparatus comprising:

means for creating a link between two regions of a virtual private network at an edge device of a first region having a first routing instance associated therewith, wherein each of said two regions comprises a different Label-Switched Path (LSP) hierarchy and said edge device is configured to participate in multiple levels of said hierarchy;

means for selecting a path;

means for forwarding a message along said path from the edge device to a network device coupled to a second region;

means for receiving a response from the network device at the edge device;

means for inserting a new Label-Switched Path (LSP) linking the two regions into a routing database for a second routing instance associated with the second region and different from said first routing instance;

means for injecting said new LSP into said first routing instance as a forwarding or routing adjacency, wherein said new LSP appears as a link to said first routing instance; and means for transmitting data on the network using said new LSP.

20. The apparatus of claim 19 wherein said first routing instance associated with the first region and said second routing instance associated with the second region are located within the edge device of the first region.

* * * * *